United States Patent [19]
Adams, Jr.

[11] 3,724,580
[45] Apr. 3, 1973

[54] CONVERTIBLE TRACK SYSTEM FOR WHEELED VEHICLE

[75] Inventor: William J. Adams, Jr., San Jose, Calif.

[73] Assignee: FMC Corporation, San Jose, Calif.

[22] Filed: Feb. 8, 1971

[21] Appl. No.: 113,528

[52] U.S. Cl. .................... 180/9.2 R, 305/23, 305/32
[51] Int. Cl. ............................................. B62d 55/04
[58] Field of Search.......... 305/35 EB, 23, 31, 32, 34; 180/9.2, 9, 9.26, 6.7

[56] References Cited

UNITED STATES PATENTS

| | | | |
|---|---|---|---|
| 1,888,420 | 11/1932 | Barnes | 305/32 |
| 2,644,539 | 7/1953 | Gazda | 305/23 X |
| 3,219,133 | 11/1965 | Clowers | 305/35 EB X |
| 2,389,308 | 11/1945 | Grove | 305/23 X |
| 3,435,907 | 4/1969 | Imhoff | 180/5 R |
| 3,180,305 | 4/1965 | Gower-Rempel | 305/35 EB |
| 3,108,564 | 10/1963 | Prosser | 305/35 EB |
| 1,453,782 | 5/1923 | Bell | 305/23 |

Primary Examiner—Richard J. Johnson
Attorney—F. W. Anderson, C. E. Tripp and R. S. Kelly

[57] ABSTRACT

An all-terrain vehicle having sets of tandem drive wheels on each side thereof can be converted to a track type vehicle with flanged idlers mounted in front of and behind each set of tandem drive wheels and an endless belt type track on each side of the vehicle extending around one set of tandem drive wheels and idlers. Tires on the tandem drive wheels drive the track by normal traction engagement and distribute the weight of the vehicle over the entire track area. Conversion from wheel to track operation does not require changes in the power transmission, all-wheel drive, suspension, or steering controls and gives the vehicle mobility in deep, powder snow.

2 Claims, 9 Drawing Figures

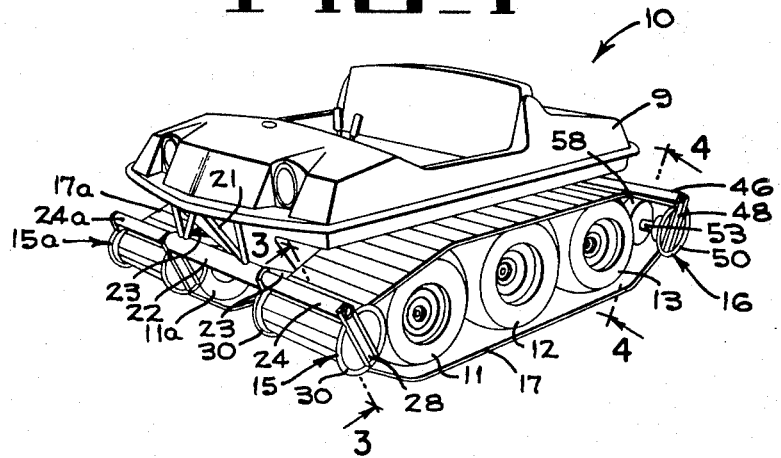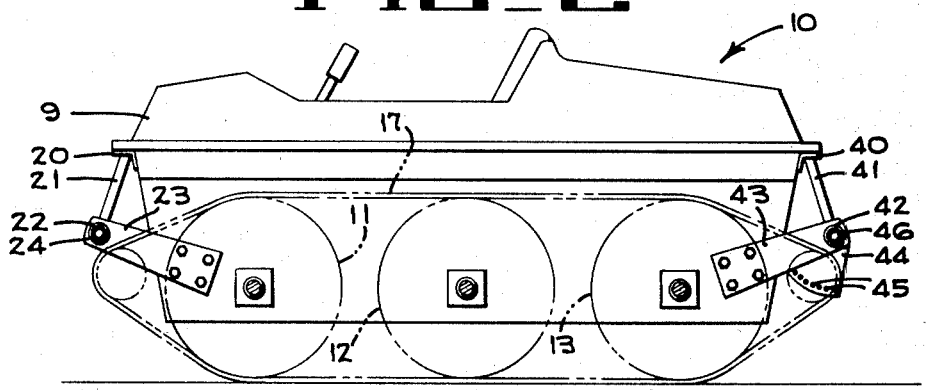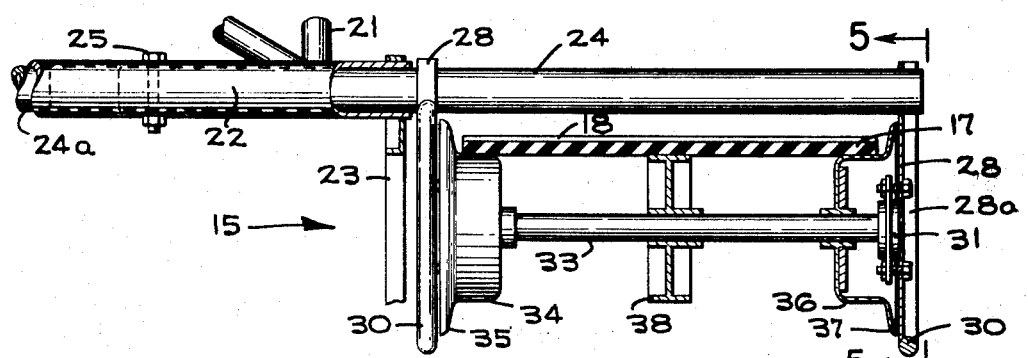

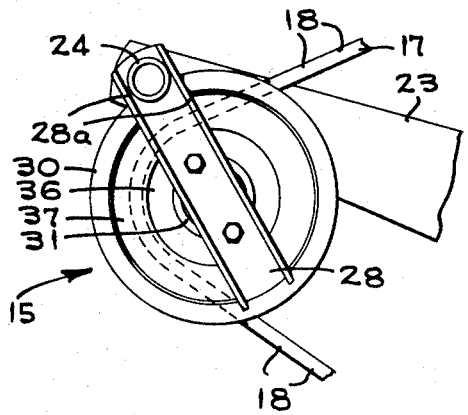
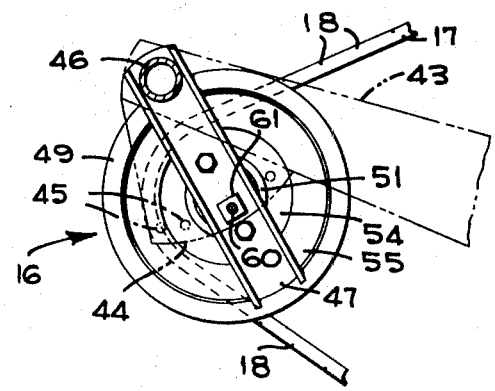
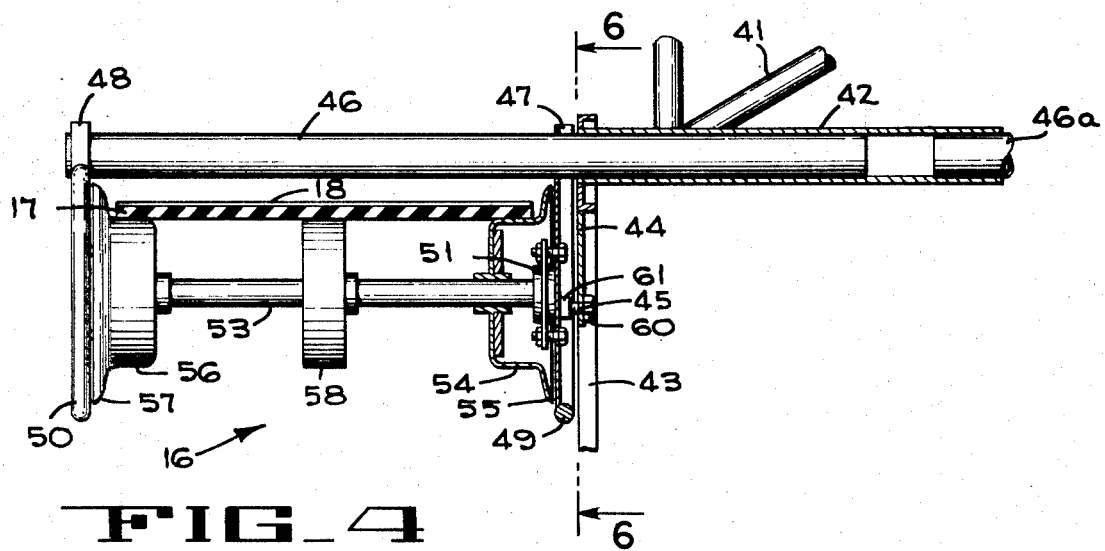
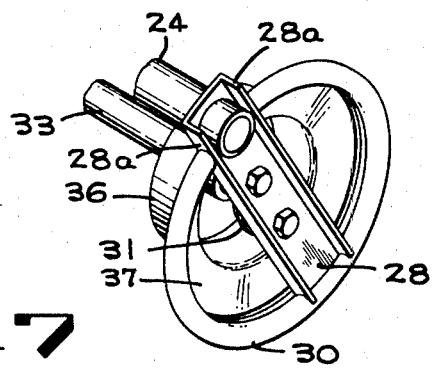

PATENTED APR 3 1973  3,724,580
SHEET 3 OF 3
FIG_8
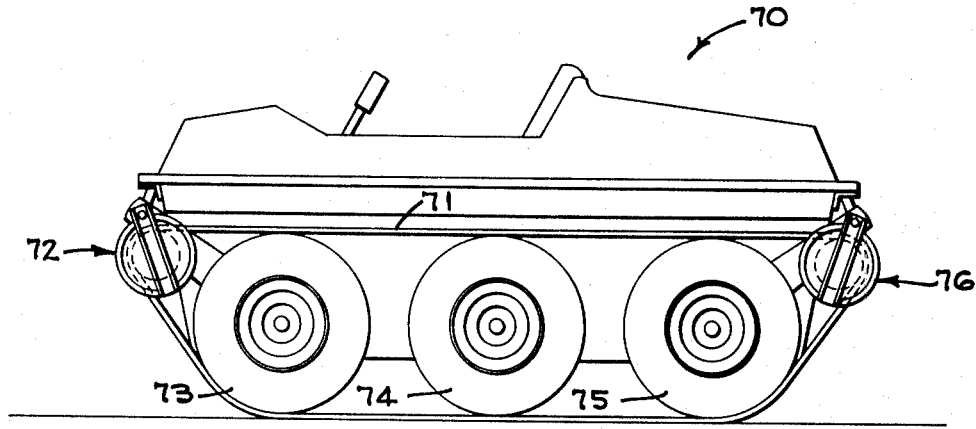
FIG_9
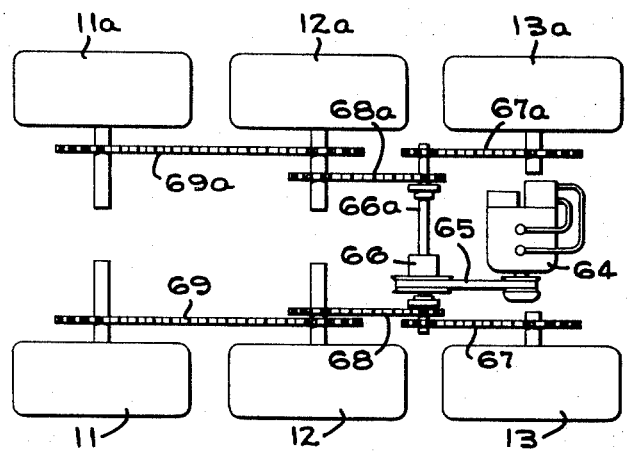

3,724,580

CONVERTIBLE TRACK SYSTEM FOR WHEELED VEHICLE

BACKGROUND OF THE INVENTION

1. Field of the Invention

This invention relates to convertible track systems for wheeled vehicles of the all-terrain type having at least two tandem drive wheels on each side thereof.

2. Description of the Prior Art

All-terrain vehicles of a variety of types are generally available today. Such vehicles are designed for mobility in natural terrain as well as under adverse driving surface conditions. These vehicles usually are provided with all-wheel drive and oversized pneumatic tires (1½ to 2 psi pressure) to provide increased traction. Despite such oversized tires however, such vehicles are generally not able to cope with deep, soft snow, which can only be handled with a track-type vehicle such as a snowmobile or the like, and it is therefore desirable to have all-terrain vehicles convertible to track-type vehicles in order to render them useful the year around in country which is subject to regular snow falls. The conversion of a wheeled vehicle to a track vehicle is normally accomplished by simply placing an endless flexible track around all of the wheels on each side of the vehicle.

One problem to be overcome in placing a flexible track about a plurality of wheels is to avoid the placing of undue forces upon the wheel axles which must be taken up by the wheel bearings thereby subjecting such bearings to overloading and resultant failure. These forces arise generally from two different sources. First, the tension of the track about the front and rear drive wheels provides oppositely directed forces tending to push the wheels together. Secondly, the guidance forces imposed on the track, particularly when the vehicle is being turned, create additional stresses in the side walls of the tires and in the wheel bearings in the axial direction.

Prior art vehicles have attempted to solve the aforementioned problems by providing idler wheels at the front and rear end of the vehicle to take substantially all of the tension forces and guidance forces of the tracks. Prior art patents which disclose means for converting a wheeled vehicle to a track-type vehicle include the U.S. patents to Barnes U.S. Pat. No. 1,888,420; Grove U.S. Pat. No. 2,389,308; and Ledohowski U.S. Pat. No. 3,163,249.

Despite the fact that idler wheels have generally been used in the prior art to permit standard drive wheels to act as bogies in converting a standard wheeled vehicle to a track-type vehicle, several problems remain to be solved. For example, convertible vehicles of the prior art generally require a special type of track wherein the idler wheels act as sprockets to maintain the track upon the drive wheels.

SUMMARY OF THE INVENTION

The objects of the present invention are to convert a conventional all-terrain vehicle from a wheeled vehicle having a ground pressure in the order of 2 psi to a track type vehicle having a ground pressure in the order of one-third psi for mobility in powder snow or the like without necessitating changes in the power transmission and wheel drive, wheel suspension, or steering and operating control; to substantially isolate track tension forces without changing the forces imposed upon the wheel axles and bearing; to utilize a simple and economical track having an inner surface without special lugs or drive sprockets; to isolate track guiding forces from the tire sidewalls and wheel bearings and to distribute these forces directly to the vehicle's hull; to distribute the weight of the vehicle and its pay load over the entire track area by using the standard drive wheels as bogies; and to allow the tires to drive the track directly by normal friction engagement.

The convertible track system of the present invention is designed for use with a vehicle having tandem drive wheels on each side thereof with each of the wheels being provided with conventional pneumatic tires. The track system includes idlers disposed both forwardly and rearwardly of the drive wheels with endless belt tracks positioned around the idlers and drive wheels and with the belts having smooth flexible inner surfaces for friction engagement with the drive wheels. Specially designed guide means are provided on the idlers for absorbing the lateral forces on the belt and distributing them directly to the body of the vehicle. It will be noted that no special sprockets or particularly configured belt is required, and inexpensive tracks will therefore be readily available for use in the convertible track system.

BRIEF DESCRIPTION OF THE DRAWINGS

FIG. 1 is a perspective view of an all-terrain vehicle having a convertible track system in accordance with the present invention.

FIG. 2 is a side elevation view of the all-terrain vehicle shown in FIG. 1 with the track and drive wheels on the near side being shown in phantom lines.

FIG. 3 is a partial section taken on the line 3—3 on FIG. 1.

FIG. 4 is a partial section taken on the line 4—4 of FIG. 1.

FIG. 5 is an end elevation taken in the direction of the arrows 5—5 of FIG. 3.

FIG. 6 is a section taken on the line 6—6 of FIG. 4.

FIG. 7 is an isometric detail view of a portion of the idler structure shown in FIG. 3.

FIG. 8 is a side elevation view of an all-terrain vehicle embodying a modified form of the convertible track system of the present invention.

FIG. 9 is a diagrammatic plan view of the vehicle drive system.

DESCRIPTION OF THE PREFERRED EMBODIMENT

With reference to FIG. 1, an all-terrain vehicle 10 of a conventional type has a hull 9 with three tandem drive wheels 11, 12 and 13 on one side and a similar set of three tandem drive wheels on the opposite side, only wheel 11a of the latter set being shown. Each of the drive wheels includes a conventional rotatably mounted hub and a wide track pneumatic tire. A front idler 15 is disposed ahead of the tandem drive wheels 11, 12 and 13, while a rear idler 16 is disposed in the same general vertical plane therebehind. An endless belt type track 17 extends around the drive wheels and idlers and is frictionally driven by each drive wheel, while the idlers isolate track tension and guidance forces from the drive wheels. Similarly, an endless belt type track 17a is trained about a front idler 15a similar to the idler 15, drive wheel 11a and the other drive wheels on the far side of the vehicle (not shown), and a rear idler (not shown) which is similar to the rear idler 16.

To mount the front idlers, an angle 20, shown in FIG. 2, is bolted to a horizontal flange projecting from hull 9 and a framework 21, which is welded to the angle, suspends a center tube 22. A pair of struts 23 are welded to opposite ends of the center tube and are bolted directly to the hull 9 adjacent to the front of the vehicle. An end tube 24 fits telescopically within the center tube and is locked in place by a bolt 25 which extends through aligned apertures in the center tube and end tube, as shown in FIG. 3. A portion of the end tube extends outwardly from the center tube and welded thereto are a pair of channel-shaped arms 28 which are spaced along the center tube in opposed relationship (FIG. 3). A ring guard 30 is attached to each of the arms 28 with the lower end of each arm being welded to the inner, circumferential face of the ring guard and with the free end of each ring guard being welded to the flanged sides 28a of the arms, as shown in FIG. 7. A bearing 31 (FIG. 3) is bolted to the inwardly extending face of each arm (one bearing only being shown in FIG. 3) so as to rotatably support a shaft 33 which extends between the arms. An inner drum 34 is mounted on the shaft adjacent the inner arm 28 and a radial flange 35 extends outward therefrom to a position spaced slightly from the periphery of the adjacent ring guard 30. Similarly, an outer drum 36 is mounted on the shaft adjacent the outer arm 28 and a radial flange 37 extends outward therefrom to a position spaced slightly from the ring guard on the outer arm. A center drum 38, located between the inner drum and outer drum, provides intermediate support for the endless track 17 the lateral edges of which are supported upon the inner and outer drums. Similar mounting structure is provided for the idler 15a which is mounted upon an end tube 24a supported at the opposite end of the center tube 22.

To mount the rear idlers, an angle 40 is bolted to a horizontal flange at the back of the vehicle 10 and a framework 41 supports a rear center tube 42 (FIG. 4). A pair of struts 43 (one only being shown) are rigidly attached to the ends of the rear center tube and are bolted directly to the hull 9 of the vehicle adjacent the rear axle thereof. A coupling plate 44, shown in FIG. 2, is welded to each strut and is provided with a series of bolt holes 45 arranged in spaced relationship in an arcuate path. An end tube 46 fits telescopically within the center tube and on the portion extending outward therefrom are welded a pair of channel-shaped arms 47 and 48 similar to the arms 28 mounting the front idler. Ring guard 49 is welded to arm 47 while ring guard 50 is welded to arm 48 in a manner similar to that previously described with respect to ring guards 30. A bearing 51 is bolted to the inner face of arm 47, and a similar bearing, not shown, is bolted to the inner face of arm 48 so as to support a shaft 53 that is journaled in the bearings. An inner drum 54 having a radial flange 55 is mounted on the shaft so that the radial flange is adjacent ring guard 49. Similarly, an outer drum 56 having a radial flange 57 is mounted on the shaft so that the radial flange is adjacent ring guard 50. A center drum 58 is mounted on the shaft between inner drum 54 and outer drum 56 to provide an intermediate support for the track 17 the side edges of which are supported upon the drums 54 and 56. It will be noted that end tube 46 is rotatable within the center tube 42, and, to tension track 17, end tube 46 is rotated so that shaft 53 moves rearwardly until the desired degree of tension is obtained. At that point, a threaded bolt 60 is inserted through the appropriate bolt hole 45 in coupling plate 44 and threaded into a nut 61 that is welded to the channelled side of arm 47. A similar rear idler and mounting is provided on an arm 46a which fits into the opposite end of center tube 42.

Track 17 is driven by friction engagement with drive wheels 11, 12 and 13, while track 17a on the opposite side of the vehicle is driven by friction engagement with drive wheels 11a, 12a and 13a. The drive wheels are driven by a drive arrangement shown schematically in FIG. 9. Power for the six wheel drive is transmitted from an engine 64 through an automatic variable-speed torque convertor 65 which is a variable pitch, belt-type drive and operates both as a clutch and transmission. A system of independent steering clutches 66 is provided so that each set of drive wheels can be operated independently while the other set is declutched, braked or stopped for turning the vehicle, or, the two sets of drive wheels can be operated together for forward motion. Power is transmitted from a clutch shaft 66a by sprocket and chain drives 67 and 67a to rear drive wheels 13 and 13a. From the clutch shaft, power is transmitted forward by sprocket and chain drives 68 and 68a to drive a pair of intermediate axles upon which drive wheels 12 and 12a are mounted. Sprocket and chain drives 69 and 69a interconnect the intermediate axles with forward axles upon which drive wheels 11 and 11a are mounted so that all of the wheels will be directly powered. If desired, a conventional forward-reverse gear box can be installed along the axis of shaft 66a so that the wheels can be driven in reverse; no changes need be made in the track system when the drive is shifted from forward to reverse.

It will be noted that the track 17 is provided with transverse ribs 18 on its outer or ground engaging surface for improving the traction but that the inner surface of the belt is smooth and requires no special lugs for engagement with the pneumatic tires on the drive wheels. It is further to be noted that the track is supported upon the smooth circumferential surfaces of the tires and on the smooth circumferential surfaces of the flanged drums 34, 36, 54 and 56 and the center support drums 38 and 58; consequently, sprocket holes, such as found in many of the prior art convertible tracks, are not necessary, and the belt can be inexpensively manufactured.

During normal driving, and especially during turning manuevers, lateral forces are imposed upon the belts which tend to cause the belts to slip off of the drive wheels. The flanges 35, 37, 55 and 57 of the drums 34, 36, 54 and 56, respectively, provide rotating reaction surfaces at the side supports for the track to resist the lateral forces on the belt and to maintain it in frictional engagement with the drive wheels. Should the track climb the flanged drum during periods of severe lateral loading, the ring guards 30, 49 and 50 are provided adjacent to the outer edges thereof to positively prevent further lateral movement of the track and to maintain it in traction engagement with the drive wheels. It will be noted that substantially all guidance forces imposed on the track and substantially all of the tension forces imposed on the track are carried by the idlers and are transmitted directly to the hull 9 of the vehicle through the supporting struts 23 and 43.

It will further be noted that the idlers 15 and 16 are positioned near the horizontal center line through the axes of the drive wheels. This provides for good gripping relationship between the track 17 and the front and rear drive wheels both at the upper and lower surfaces of the outer set of tires.

A modified form of the invention is shown in FIG. 8. An all-terrain vehicle 70 has a convertible track system substantially as shown in FIG. 1, but it will be noted that the upper run of an endless belt type track 71 extends in a straight line across the upper surface of a front idler 72, three tandem drive wheels 73, 74 and 75, and a rear idler 76. The only structural change in this modification from the form of invention previously disclosed is that the front and rear idlers have been elevated to a higher position so as to maintain the upper run of the track in a straight line. In this position, there is no normal force applied to the upper surfaces of the drive wheel tires other than the dead load of the track itself. It will be recognized that when a tire is gripped by the track at both the top and the bottom thereof, such a condition might create scuffing of the tire due to the fact that the free radius of the tire is larger than the loaded radius. In the form of the invention shown in FIG. 8, this problem is avoided since gripping of the track at the top of the tires is prevented.

Although the best modes contemplated for carrying out the present invention have been herein shown and described, it will be apparent that modification and variation may be made without departing from what is regarded to be the subject matter of the invention.

What is claimed is:

1. A convertible track system for a vehicle having two sets of tandem drive wheels, one set of drive wheels being located on one side of the vehicle and the other set of drive wheels being located on the opposite side of the vehicle with pneumatic tires being provided on all wheels, said system comprising:

a pair of front idlers, one idler being disposed ahead of one set of drive wheels and the other idler being disposed ahead of the opposite set of drive wheels, said front idlers being mounted for rotation in the same general vertical planes as the drive wheels;

a pair of rear idlers, one idler being disposed behind one set of drive wheels and the other idler being disposed behind the opposite set of drive wheels, said rear idlers being mounted for rotation in the same general vertical planes as the drive wheels and front idlers;

means for supporting each idler from the vehicle independently of the drive wheel mountings;

a pair of flexible endless belt type tracks, one track being trained about one set of drive wheels and idlers and the other track being trained about the opposite set of drive wheels and idlers, each belt having a transversely planar inner surface;

said idlers having cylindrical surfaces supporting the transversely planar inner surface of the track trained thereabout, said idlers further having flanges extending radially outward from both ends thereof opposite each side of the belt type track; and stationary ring guards mounted upon said idler support means with one guard positioned circumferentially adjacent the outermost edge of each idler flange to restrain the track in the event that it should ride up and over the idler flange;

whereby the tracks are frictionally driven by the drive wheels and the idlers serve to isolate track tension forces and lateral track guidance forces from the drive wheels.

2. An all-terrain vehicle convertible for all season operation comprising a hull; a set of two or more tandem drive wheels mounted on one side of the hull and a set of two or more tandem drive wheels mounted on the opposite side of the hull, each wheel having a pneumatic tire thereon; a frame extending forward from the hull; a pair of front idlers supported by said frame with one idler disposed ahead of one set of tandem drive wheels and the other idler disposed ahead of the opposite set of drive wheels, said front idlers being mounted for rotation in the same general vertical planes as the drive wheels; a frame extending rearward from the hull; a pair of rear idlers supported by said rearwardly extending frame with one idler disposed behind one set of drive wheels and the other idler disposed behind the opposite set of drive wheels, said rear idlers being mounted for rotation in the same general vertical planes as the drive wheels and front idlers; a pair of flexible endless belt type tracks, one track being trained about one set of drive wheels and idlers and the other track being trained about the opposite set of drive wheels and idlers, each track having a transversely planar inner surface for contacting the pneumatic tires on the drive wheels, said tracks being tensioned for gripping engagement with said tires; each of said idlers having a cylindrical surface supporting the transversely planar inner surface of the associated track and flanges extending radially outward from both ends of the cylindrical surface opposite each side of the belt type track; and stationary ring guards mounted upon side idler support frames with one guard positioned circumferentially adjacent the outermost edge of each idler flange to restrain the associated track in the event that it should ride up and over the flange; whereby the tracks are frictionally driven by the drive wheels and the idlers isolate track tension forces and lateral track guidance forces from the drive wheels.

* * * * *

UNITED STATES PATENT OFFICE
CERTIFICATE OF CORRECTION

Patent No. 3,724,580　　　　　　　　Dated April 3, 1973

Inventor(s) WILLIAM J. ADAMS, JR.

It is certified that error appears in the above-identified patent and that said Letters Patent are hereby corrected as shown below:

Column 6, line 12 - delete "ring".

Column 6, line 14 - After "adjacent" insert -- and generally radially outwardly of a major portion of --.

Column 6, line 50 - Delete "ring".

Column 6, line 51 - change "side" to -- said --.

Column 6, line 52 - after "adjacent" insert -- and generally radially outwardly of a major portion of --.

Signed and sealed this 25th day of December 1973.

(SEAL)
Attest:

EDWARD M. FLETCHER, JR.　　　　RENE D. TEGTMEYER
Attesting Officer　　　　　　　　Acting Commissioner of Patents